(12) United States Patent
Kogure et al.

(10) Patent No.: US 9,017,840 B2
(45) Date of Patent: Apr. 28, 2015

(54) BATTERY

(75) Inventors: Masanori Kogure, Tokyo (JP); Daisuke Chiba, Tokyo (JP)

(73) Assignee: Delta Electronics, Inc., Taoyuan County (TW)

( * ) Notice: Subject to any disclaimer, the term of this patent is extended or adjusted under 35 U.S.C. 154(b) by 705 days.

(21) Appl. No.: 13/284,548

(22) Filed: Oct. 28, 2011

(65) Prior Publication Data

US 2012/0114987 A1    May 10, 2012

(30) Foreign Application Priority Data

Nov. 9, 2010 (JP) ................................. 2010-251082

(51) Int. Cl.
| | |
|---|---|
| *H01M 2/12* | (2006.01) |
| *H01M 2/02* | (2006.01) |
| *H01M 2/06* | (2006.01) |
| *H01M 2/26* | (2006.01) |
| *H01M 2/30* | (2006.01) |

(52) U.S. Cl.
CPC ................ *H01M 2/024* (2013.01); *H01M 2/06* (2013.01); *H01M 2/266* (2013.01); *H01M 2/305* (2013.01)

(58) Field of Classification Search
CPC ....... H01M 2/06; H01M 2/266; H01M 2/024; H01M 2/305; Y02E 60/12
USPC ............................................ 429/56, 177, 179
See application file for complete search history.

(56) References Cited

FOREIGN PATENT DOCUMENTS

| JP | 11-273638 A | 10/1999 | |
|---|---|---|---|
| JP | 2001-185118 A | 7/2001 | |
| JP | 2003-7340 A | 1/2003 | |
| JP | 2003007340 A * | 1/2003 | ............ H01M 10/40 |
| JP | 2009-146601 A | 7/2009 | |
| JP | 2009146601 A * | 7/2009 | |

OTHER PUBLICATIONS

Japanese Office Action dated Mar. 26, 2013, issued in corresponding Japanese Patent Application No. A 2010-251082, w/ English translation.

* cited by examiner

*Primary Examiner* — Gary Harris
(74) *Attorney, Agent, or Firm* — Westerman, Hattori, Daniels & Adrian, LLP (57) ABSTRACT

A battery includes: an electrode stacked body; a battery case that accommodates the electrode stacked body; positive and negative electrode terminals that are provided so as to communicate inside and outside of the battery case with each other; a lead that electrically connects tabs of the electrode stacked body to the electrode terminals; and an insulated lead insulating cover in which a space is formed so that the lead enters and a terminal through-hole is formed so that one end of the electrode terminal enters the space therethrough. An insulated lead insulating cover includes a first cover component and a second cover component that cooperatively form the space and the terminal through-hole with each other, and the first cover component and the second cover component respectively include engagement portions engaging removable with each other.

5 Claims, 9 Drawing Sheets

BATTERY

BACKGROUND OF THE INVENTION

1. Field of the Invention

The present invention relates to a battery that includes an electrode stacked body formed by stacking a plurality of electrode plates, an electrode terminal, and a lead electrically connecting the electrode terminal to tabs extending from the electrode plates.

Priority is claimed on Japanese Patent Application No. 2010-251082, filed on Nov. 9, 2010, the content of which is incorporated herein by reference.

2. Description of Related Art

As one type of battery, for example, as disclosed in Japanese Patent Application Laid-Open No. H11-273638, there is a battery that includes an electrode stacked body formed by stacking a plurality of electrode plates, a battery case to storage the electrode stacked body, an electrode terminal connected to the battery case, and a lead electrically connecting the electrode terminal to tabs extending from the electrode plates in the electrode stacked body.

As disclosed in the Japanese Patent Application Laid-Open No. H11-273638, an insulating member is provided, which has a hole for storing the lead in its space and for extracting the lead therefrom. Therefore, the lead and the inner surface of the metallic battery case are insulated by the insulating member. In this technique, the lead is not inserted into the hole of the insulating member, after the tab and the electrode terminal fixed to the cover of the battery case are connected each other through the lead. For this reason, after connecting the tab and one end of the lead to each other, the lead is inserted into the hole of the insulating member. Then, the other end of the lead and the electrode terminal are connected to each other. Because the electrode stacked body and the cover of the battery case are connected through the lead with the insulating member hanging from the lead, and the electrode stacked body is stored in the battery case. Then the next manufacturing process is performed.

However, because the lead needs to be inserted into the hole of the insulating member and the lead needs to be connected to the electrode terminal, the connection work is time-consuming and increases time and effort of manufacturing works.

SUMMARY OF THE INVENTION

The invention is to provide a battery capable of reducing the time and effort of manufacturing work while ensuring an insulating property between a lead and a battery case.

According to a first aspect of the battery of the invention, there is provided a battery including: an electrode stacked body in which positive and negative electrode plates are alternately stacked with separators; a battery case that stores the electrode stacked body; positive and negative electrode terminals that are provided to link the inside and the outside of the battery case; a lead that electrically connects tabs extending from the electrode plates of the electrode stacked body to the electrode terminals; and an lead insulating cover made of an insulating material and including a side plate and a terminal through-hole, wherein the side plate faces an inner peripheral surface of the battery case and a space for storing the lead is formed by the side plate, wherein one end of the electrode terminal enters the space, wherein the lead insulating cover includes a first cover component and a second cover component that cooperatively form the space and the terminal through-hole, and wherein the first cover component and the second cover component respectively include engagement portions joining each other detachably.

According to the first aspect of the invention, when the first cover component and the second cover component engage with each other to form the lead insulating cover even after the electrode terminal and the tab extending from the electrode stacked body are connected to each other through the lead, the lead may be accommodated inside the space of the lead insulating cover.

In a second aspect of the battery of the invention, the first cover component forms one component in a first direction in which the plurality of electrode plates is stacked in the portion of the lead insulating cover, and the second cover component form the other component in the first direction in the portion of the lead insulating cover. When the engagement portion of the first cover component and the engagement portion of the second cover component engage with each other, the first cover component is restrained so as not to move relative to the second cover component in a direction perpendicular to the first direction, that is, a second direction in which the electrode terminal is close to or away from the electrode stacked body and a third direction which is perpendicular to the first direction and to the second direction.

According to the second aspect of the invention, the engagement state between the first and second cover components may be easily maintained.

In a third aspect of the battery of the invention, the first cover component includes a first engagement portion and a second engagement portion as the engagement portion. The second cover component includes a first engagement portion engaging with the first engagement portion of the first cover component and a second engagement portion engaging with the second engagement portion of the first cover component as the engagement portion. A locking surface facing one direction of the second direction is formed in the first engagement portion of the first cover component, and a subject locking surface coming into contact with the locking surface is formed in the first engagement portion of the second cover component. A locking surface facing one direction of the second direction is formed in the second engagement portion of the second cover component, and a subject locking surface coming into contacting with the locking surface is formed in the second engagement portion of the first cover component.

According to the third aspect of the invention, the first cover component may be restrained so as not to move relative to the second cover component in the second direction due to the first engagement portion and the second engagement portion respectively provided in the cover components.

In a fourth aspect of the invention, the engagement portion of the first cover component is provided with a locking surface facing one direction of the third direction and a subject locking surface facing the other direction of the third direction. The engagement portion of the second cover component is provided with a subject locking surface coming into contact with the locking surface of the first cover component and a locking surface coming into contact with the subject locking surface of the first cover component.

According to the fourth aspect of the invention, the first cover component may be restrained so as not to move relative to the second cover component in the third direction due to the engagement portion.

In a fifth aspect of the battery of the invention, in the engagement portion of the first cover component and the engagement portion of the second cover component, one engagement portion includes a claw that protrudes in a direction different from the first direction and an elastic support portion that supports the claw so that the position of the claw is able to change in the protruding direction of the claw, and in the engagement portion of the first cover component and the engagement portion of the second cover component, the other engagement portion includes a concave portion which the claw enters into.

According to the fifth aspect of the invention, the relative movement of the first cover component relative to the second cover component in the first direction may be regulated by the engagement portion. Further, even when the first cover component and the second cover component engage with each other, the first cover component may move to a certain degree relative to the second cover component in the first direction, that is, the stacked direction of the electrode stacked body. For this reason, it is possible to handle a change in specification such as a change in number of the electrode plates constituting the electrode stacked body or a change in thickness of the electrode plate.

In a sixth aspect of the battery of the invention, the battery case includes a rupturable vent that is operated when inside of the battery case becomes a predetermined pressure or more due to a gas generated inside the battery case. The lead insulating cover includes a first gas passage hole that penetrates from the space toward the rupturable vent and a pair of side plates that serves as the side plates facing each other in the third direction as a direction perpendicular to the first direction as the stacked direction of the plurality of electrode plates stacked and perpendicular to the second direction as the direction in which the electrode terminal is close to or away from the electrode stacked body. The pair of side plates of the lead insulating cover include's a second gas passage hole that introduces the gas, accumulated between the inner surface of the battery case and the outer peripheral edge adjacent to the outer peripheral edge where the tab extends and corresponds to the outer peripheral edges of the plurality of electrode plates, into the space.

According to the sixth aspect of the invention, even when the lead insulating cover is present, the gas generated in the electrode stacked body may be reliably guided to the rupturable vent.

In a seventh aspect of the battery of the invention, the first cover component and the second cover component have a same shape and a same dimensions.

According to the seventh aspect of the invention, since the respective cover components are the same components, manufacturing costs may be reduced.

In the aspects of the invention, when the first cover component and the second cover component engage with each other to form the lead insulating cover even after the electrode terminal and the tab extending from the electrode stacked body are connected to each other through the lead, the lead may be accommodated inside the space of the lead insulating cover, and the insulating property between the lead and the battery case may be ensured. Accordingly, in the invention, it is possible to avoid time-consuming work in which the lead is connected to the external connection terminal while the lead is inserted into the lead extracting hole of the insulating member ensuring the insulating property between the lead and the battery case as in the related art. Furthermore, it is possible to avoid work in which the electrode stacked body and the cover of the battery case are connected to each other through the lead and the state of the insulating member hanging on the lead is handled.

Therefore, according to the invention, it is possible to reduce time and effort of battery manufacturing work.

DETAILED DESCRIPTION OF THE INVENTION

Figure 1:
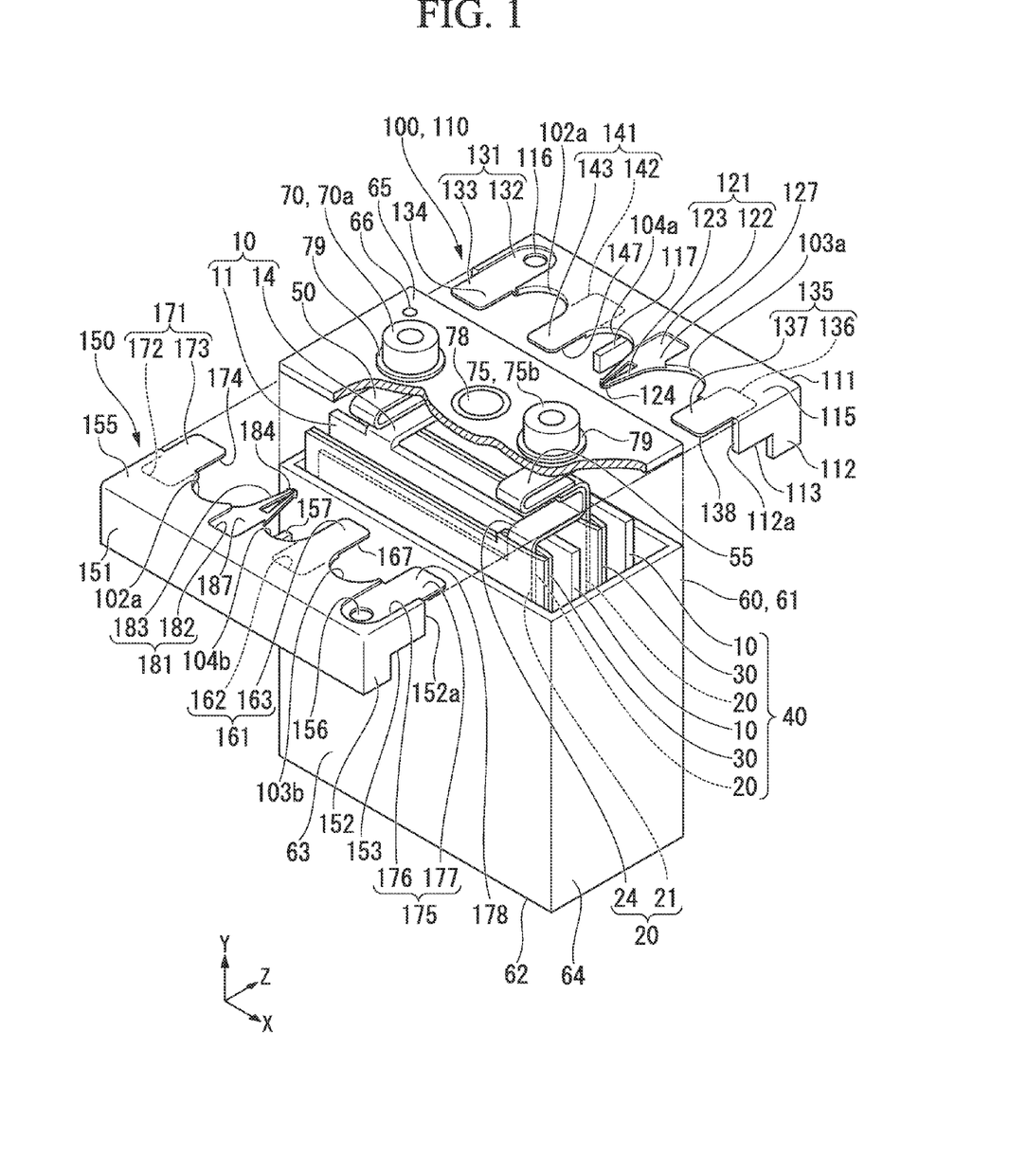
FIG. 1 is an exploded perspective view illustrating a battery of an embodiment according to the invention.
Figure 2:
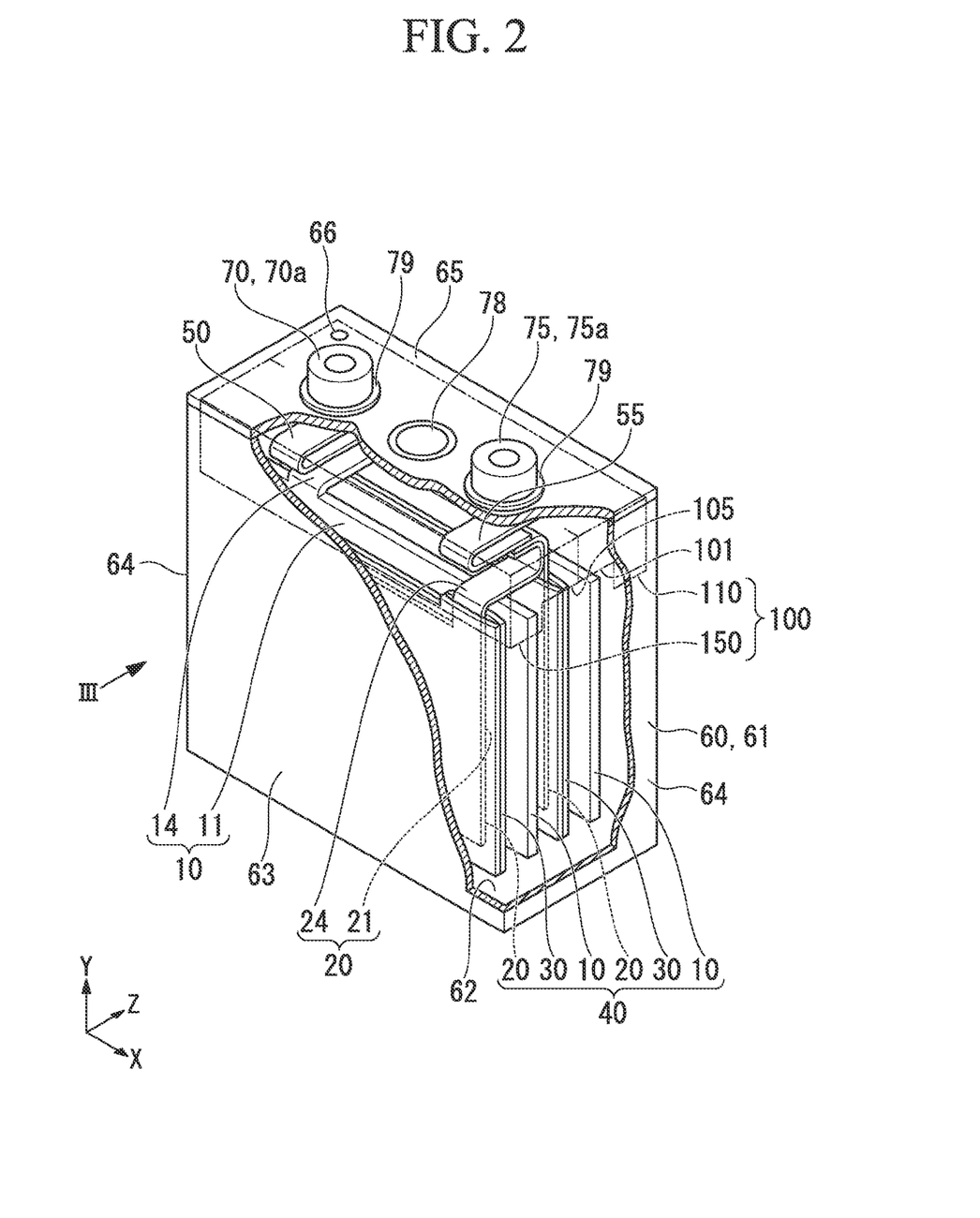
FIG. 2 is a cutaway perspective view illustrating a main part of the battery of the embodiment according to the invention.

As shown in FIGS. 1 and 2, a battery of the embodiment includes a plurality of positive electrode plates 10, a plurality of negative electrode plates 20, separators 30 respectively covering the negative electrode plates 20, an electrolyte, and a metallic battery case 60 for storing the positive electrode plates 10, negative electrode plates 20, separators 30, and the electrolyte.

The electrode plates 10 and 20 respectively include electrode plate bodies 11 and 21 and tabs 14 and 24 that extend from the edges of the electrode plate bodies 11 and 21. A rectangular core of the electrode plate such as an aluminum foil or a copper foil is coated with an active material. The electrode plate body 21 of the negative electrode plates 20 is completely covered by separator 30, and a part of the tab 24 of the negative electrode plate 20 is exposed from the separator 30.

The plurality of positive electrode plates 10 and the plurality of negative electrode plates 20 covered by the separators 30 are alternately stacked, and the tabs 14 and 24 protrude in the same direction, for forming an electrode stacked body 40. The positive electrode tabs 14 and the negative electrode tabs 24 are arranged in a direction perpendicular to the direction of stacking the electrode plates. Here, the direction in which the plurality of positive electrode plates 10 and the plurality of negative electrode plates 20 are stacked is set as the Z direction (first direction). The direction, which is perpendicular to the Z direction and in which the positive electrode tabs 14 and the negative electrode tabs 24 are lined up, is set as the X direction (third direction). And the direction which is perpendicular to the Z direction and to the X direction is set as the Y direction (second direction).

Hereunder, +X side indicates the positive side in the X direction, −X side indicates the negative side in the X direction, +Y side indicates the positive side in the Y direction, −Y side indicates the negative side in the Y direction, +Z side indicates the positive side in the Z direction, and −Z side indicates the negative side in the Z direction.

The battery case 60 includes a case body 61, which is a rectangular parallelepiped shape having a bottom like a concave for storing the electrode stacked body 40, and a cover 65 for covering the opening of the case body 61 tightly. The case body 61 includes a pair of first side plates 63 formed in a rectangular shape and facing each other, a pair of second side plates 64 formed in a rectangular shape in the same manner and facing each other, and a rectangular bottom plate 62. And these plates 62, 63, and 64 form the concave. Here, the pair of first side plates 63 faces each other in the Z direction, and the pair of second side plates 64 faces each other in the X direction.

Further, the opening of the case body 61 is formed on the +Y side with respect to the bottom plate 62.

The cover 65 is formed in a rectangular plate shape corresponding to the rectangular opening of the case body 61. A positive electrode terminal 70 and a negative electrode terminal 75 are fixed to the cover 65 through an insulating material 79. A rupturable vent 78 is formed in the cover 65, which is arranged between the positive electrode terminal 70 and the negative electrode terminal 75 and which works when the pressure inside the battery case 60 becomes a predetermined value or more. Here, the positive electrode terminal 70, the negative electrode terminal 75, and the rupturable vent 78 are arranged in the X direction. Further, in the four corners of the cover 65, injection holes 66 are respectively formed at a position near the corner on the +Z side and the −X side and a position near the corner on the −Z side and the +X side so as to pour the electrolyte into the case body 61. However, the injection holes 66 are sealed after the electrolyte is injected into the battery case 60.

Figure 3:
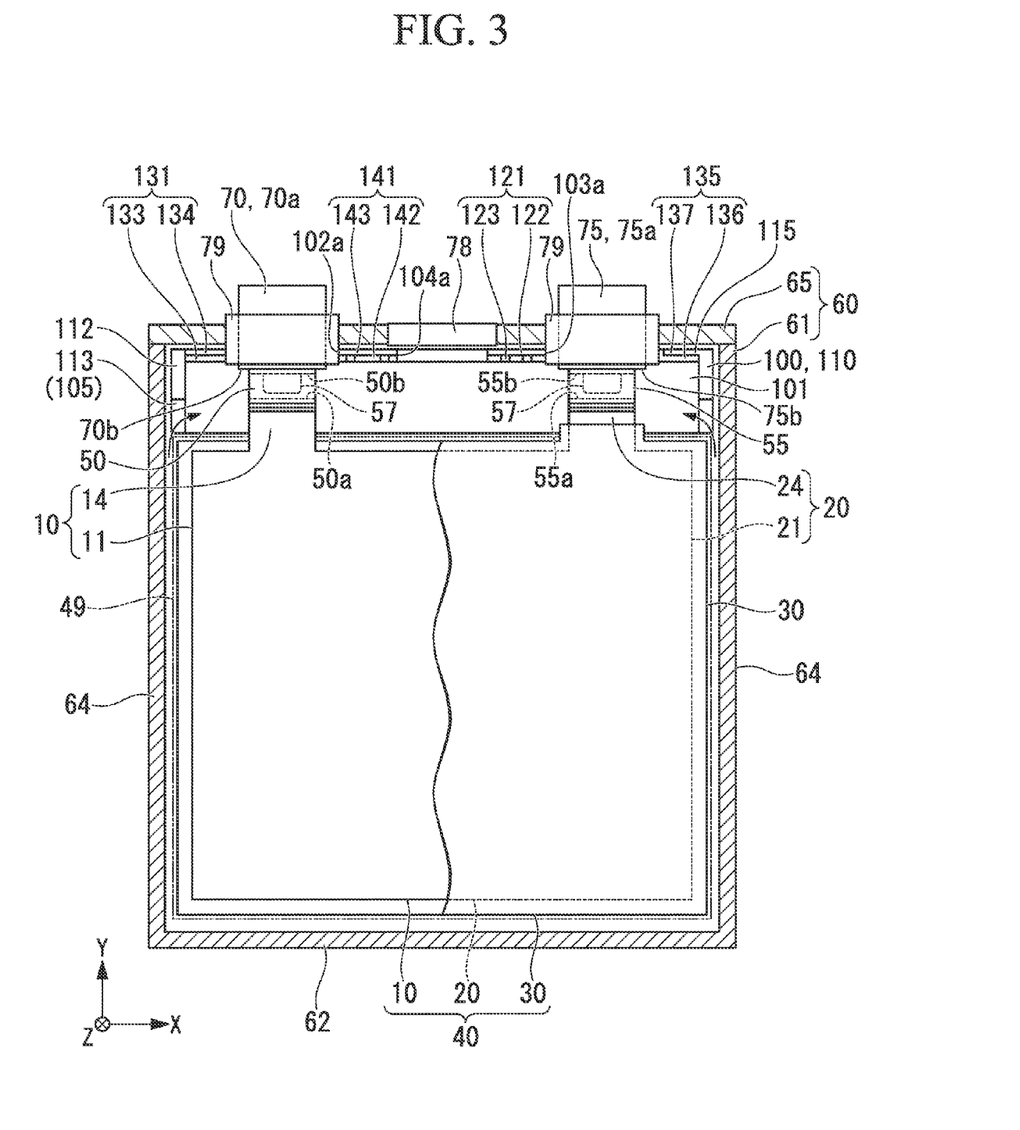
FIG. 3 is a perspective view illustrating a state where a battery case of FIG. 2 is cut away when taken view from the arrow III.

As shown in FIGS. 1 and 3, the positive electrode terminal 70 and the negative electrode terminal 75 respectively include external connection portions 70a and 75a that protrude from the cover 65 to outside of the battery case 60 in the +Y direction, and lead connection portions 70b and 75b that protrude from the cover 65 to inside of the battery case 60 in the −Y direction. FIG. 3 is a perspective view when taken view from the arrow III of FIG. 2. However, in FIG. 3, only the cross-section of the battery case 60 is shown.

As shown in FIG. 3, the positive electrode tab 14 of the electrode stacked body 40 is welded to one end 50a of the positive electrode lead 50, and the other end 50b of the positive electrode lead 50 is connected to the lead connection portion 70b of the positive electrode terminal 70 through, for example, a screw 57. Further, the negative electrode tab 24 of the electrode stacked body 40 is welded to one end 55a of the negative electrode lead 55, and the other end 55b of the negative electrode lead 55 is connected to the lead connection portion 75b of the negative electrode terminal 75 through, for example, a screw 57.

Figure 9:
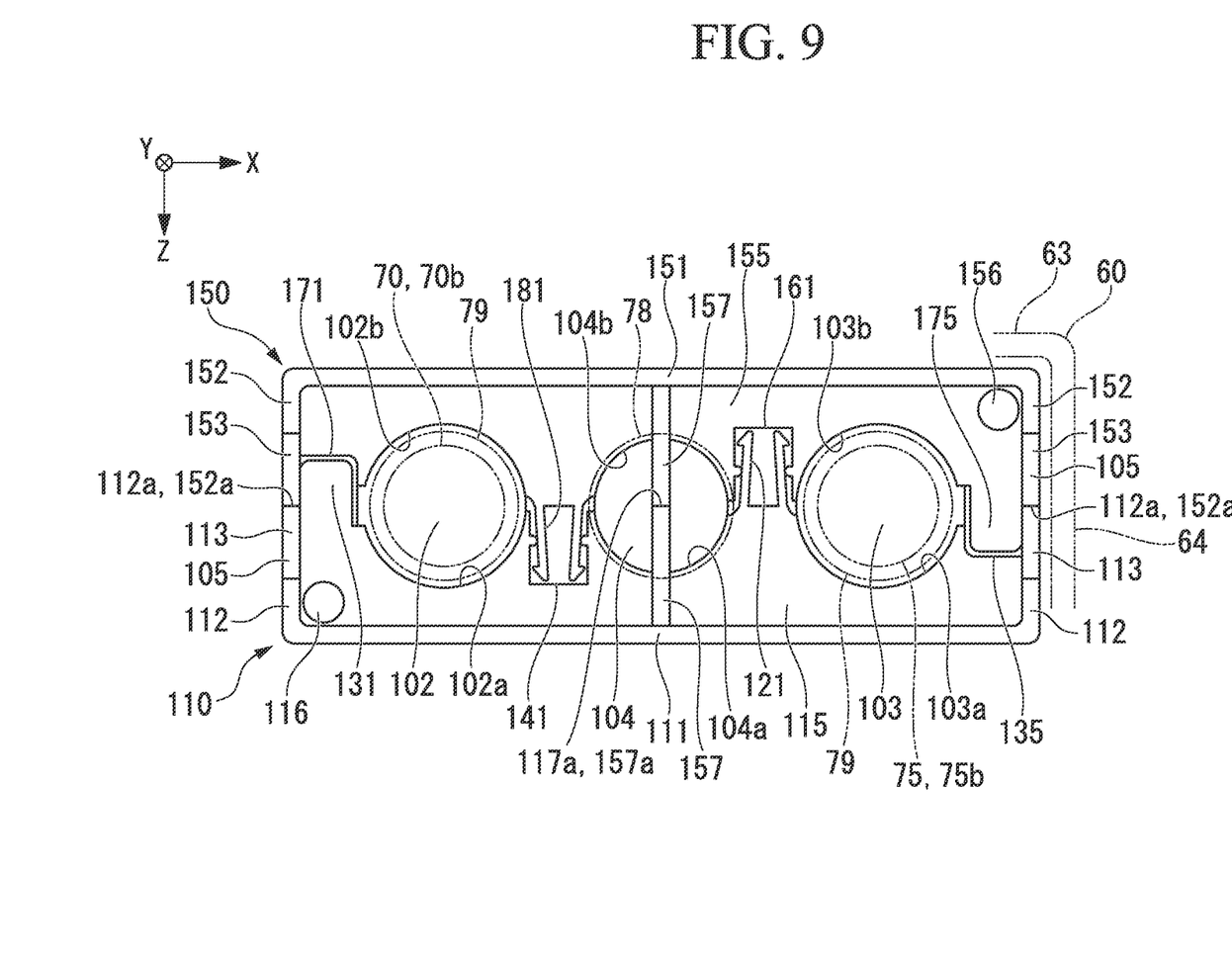
FIG. 9 is a (second) rear view illustrating the lead insulating cover when the components engage with each other in the embodiment according to the invention.

As shown in FIGS. 2 and 3, in the battery case 60, the positive electrode lead 50 and the negative electrode lead 55 are covered by a lead insulating cover 100 formed of an insulating resin. In other words, the lead insulating cover 100 forms a space 101 which the leads 50 and 55 are put in. Further, as shown in FIG. 9, the lead insulating cover 100 is provided with a circular through-hole 102 for the positive electrode terminal through which the lead connection portions 70a and 70b of the positive electrode terminal 70 pass, a circular through-hole 103 for the negative electrode terminal through which the lead connection portions 75a and 75b of the negative electrode terminal 75 pass, a circular first gas passage hole 104 arranged from the space 101 toward the rupturable vent 78, a second gas passage hole 105 arranged from the second side plate 64 of the body of the battery case 60 toward inside of the space 101, and an electrolyte passage hole arranged at the position corresponding to the injection hole 66 of the cover 65 of the battery case 60. FIG. 9 is a rear view illustrating the lead insulating cover 100.

Figure 4:
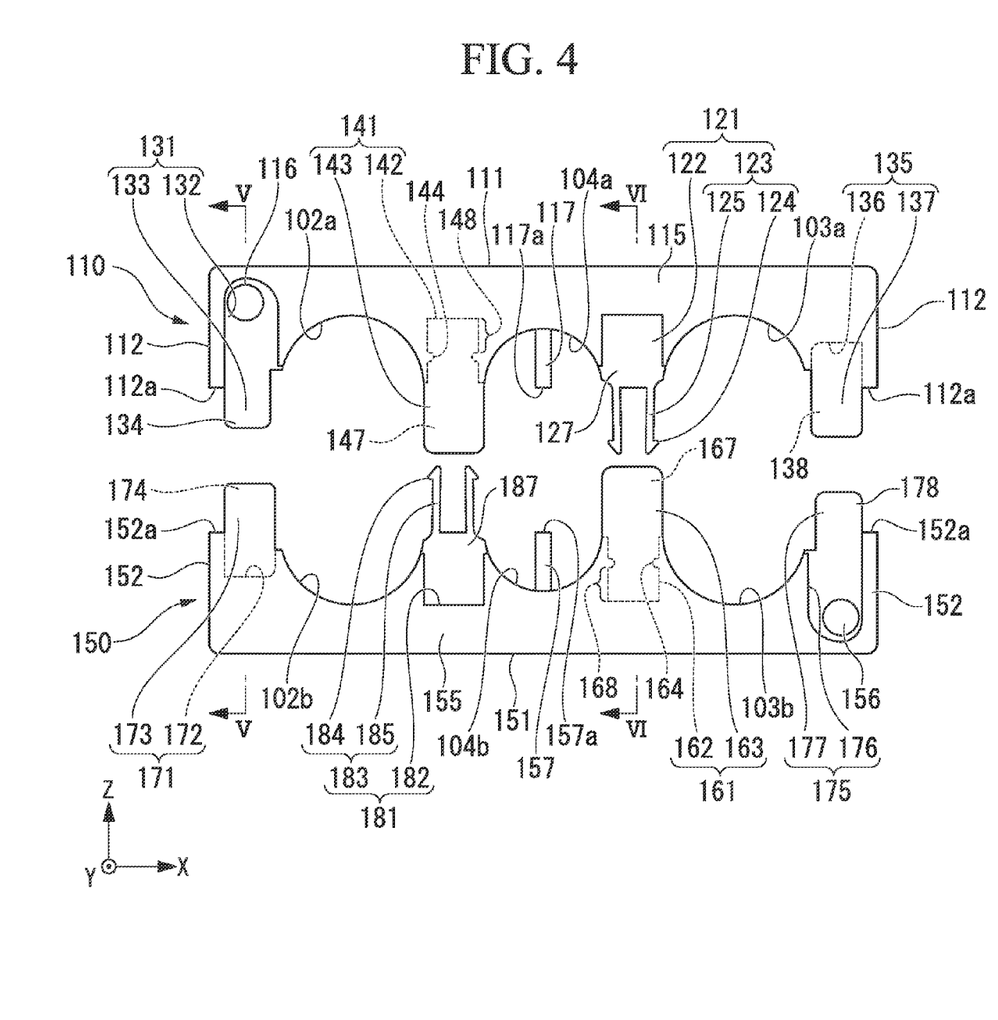
FIG. 4 is a plan view illustrating a lead insulating cover when components do not engage with each other in the embodiment according the invention.
Figure 5:
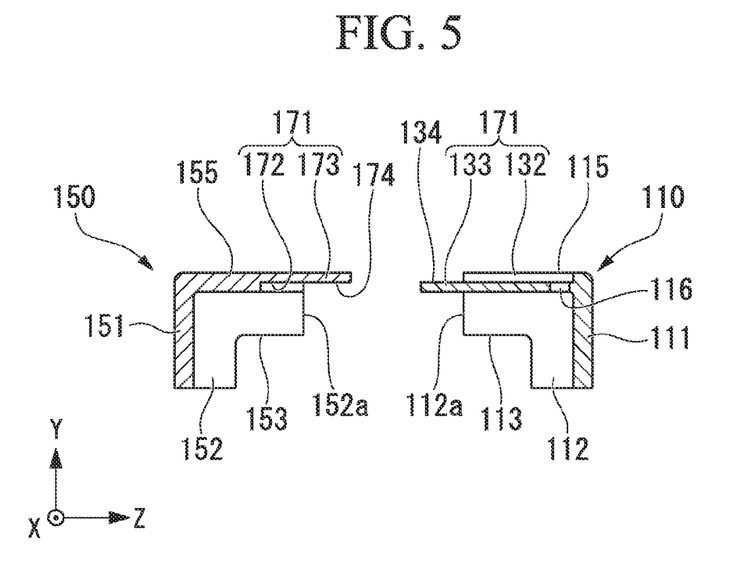
FIG. 5 is a cross-sectional view taken along the line V-V of FIG. 4.
Figure 6:
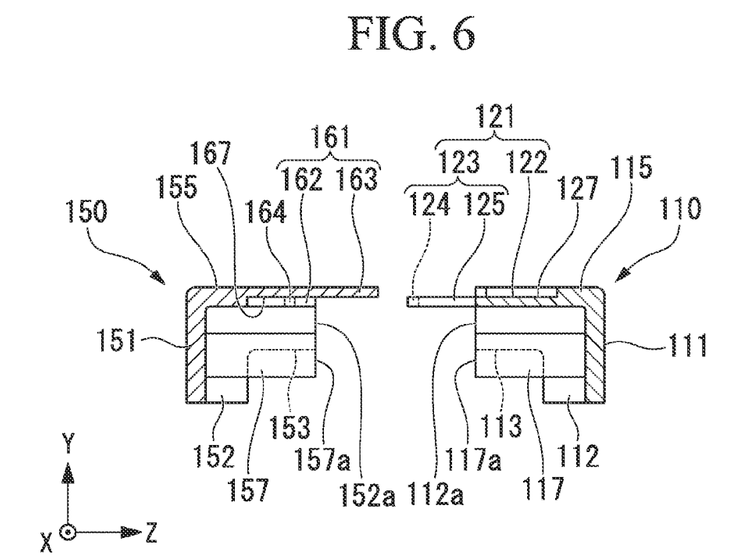
FIG. 6 is a cross-sectional view taken along the line VI-VI of FIG. 4.
Figure 7:
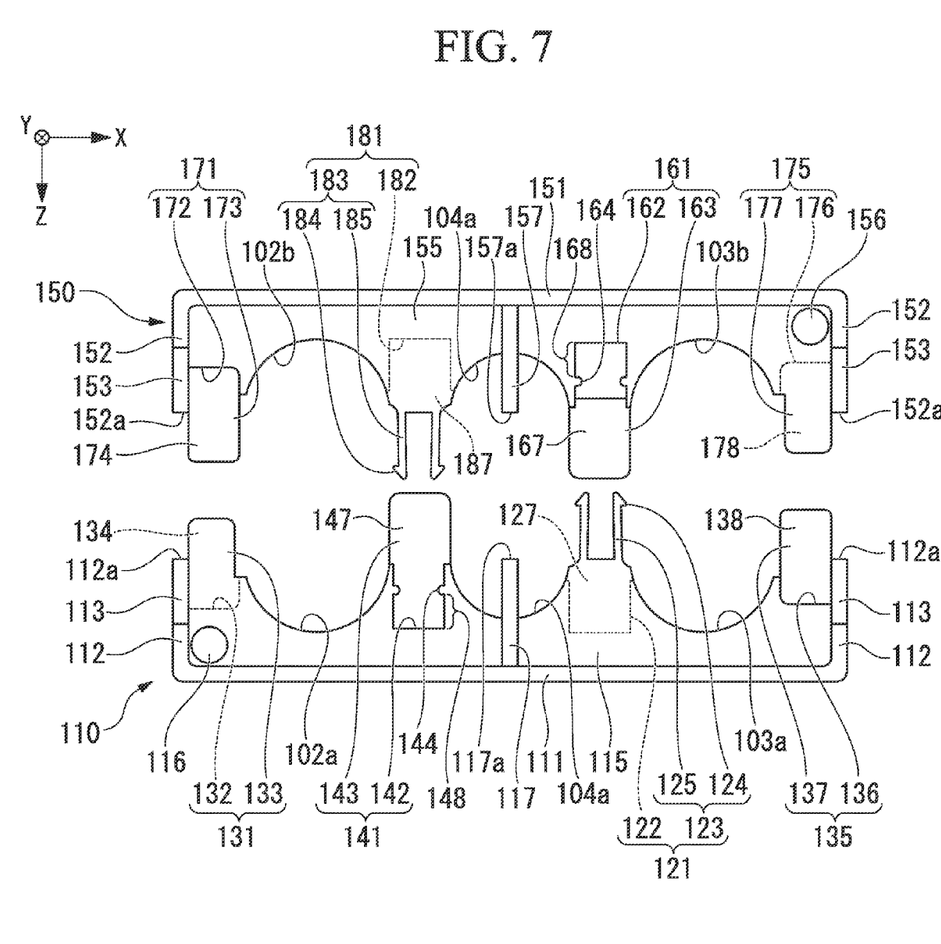
FIG. 7 is a rear view illustrating the lead insulating cover when the components do not engage with each other in the embodiment according to the invention.

As shown in FIGS. 1 and 4 to 7, the lead insulating cover 100 includes a first cover component 110 arranged on the +Z side and a second cover component 150 arranged on the −Z side. Furthermore, these drawings all show the lead insulating cover 100 in the case that the first cover component 110 and the second cover component 150 are separated from each other. FIG. 4 is a plan view illustrating the lead insulating cover 100 (with taken view from the +Y side), FIG. 5 is a cross-sectional view taken along the line V-V of FIG. 4, FIG. 6 is a cross-sectional view taken along the line VI-VI of FIG. 4, and FIG. 7 is a rear view of the lead insulating cover 100 (with taken view from the −Y side).

The first cover component 110 and the second cover component 150 respectively include cover opposite plates 115 and 155 that face the cover 65 of the battery case 60 and a pair of second side plates 112 and 152 that faces the pair of second side plates 64 of the battery case 60. Furthermore, the first cover component 110 includes a first side plate 111 that faces the first side plate 63 on the +Z side in the pair of first side plates 63 of the battery case 60, and the second cover component 150 includes a first side plate 151 that faces the first side plate 63 on the −Z side of the battery case 60.

The length of the first side plate 111 of the first cover component 110 in the X direction is the same as that of the first side plate 151 of the second cover component 150. And the length is slightly shorter than the width of the opening of the battery case body 61 in the X direction. Further, the length of the pair of second side plates 112 of the first cover component 110 in the Z direction is the same as that of the pair of second side plates 152 of the second cover component 150. And the length adding the lengths of the second side plates 112 and 152 in the Z direction is slightly shorter than the width of the opening of the battery case body 61 in the Z direction.

The cover opposite plate 115 of the first cover component 110 and the cover opposite plate 155 of the second cover component 150 cooperatively form the cover opposite plate of the lead insulating cover 100. Further, one second side plate 112 of the first cover component 110 and one second side plate 152 of the second cover component 150 cooperatively form one second side plate of the lead insulating cover 100. And the other second side plate 112 of the first cover component 110 and the other second side plate 152 of the second cover component 150 cooperatively form the other second side plate of the lead insulating cover 100. Further, the first side plate 111 of the first cover component 110 forms one first side plate of the pair of first side plates of the lead insulating cover 100 only by the first side plate 111. And the first side plate 151 of the second cover component 150 forms the other first side plate of the pair of first side plates of the lead insulating cover 100 only by the first side plate 151.

The cover opposite plate 115 of the first cover component 110 and the cover opposite plate 155 of the second cover component 150 are respectively provided with engagement portions 121, 161 joining each other detachably.

Furthermore, the cover opposite plate 115 of the first cover component 110 and the cover opposite plate 155 of the second cover component 150 are respectively provided with positive electrode terminal segmenting holes 102a and 102b that cooperatively form the positive electrode terminal through-hole 102, negative electrode terminal segmenting holes 103a and 103b that cooperatively form the negative electrode terminal through-hole 103, and first segmenting holes 104a and 104b that cooperatively form the first gas passage hole 104. The edges of the positive electrode terminal segmenting hole 102a, the negative electrode terminal segmenting hole 103a, and the first segmenting hole 104a of the first cover component 110 and the positive electrode terminal segmenting hole 102b, the negative electrode terminal segmenting hole 103b, and the first segmenting hole 104b of the second cover component 150 are all formed in a semi-circular shape.

The pair of second side plates 112 of the first cover component 110 and the pair of second side plates 152 of the second cover component 150 respectively form the second segmenting holes 113 and 153 cooperatively forming the second gas passage hole 105. The respective segmenting holes 113 and 153 are rectangular notches formed by making the second side plates 112 and 152 of the cover components 110 and 150 be concave from the −Y side toward the +Y side.

As the engagement portions of the cover opposite plates 115 and 155 of the first cover component 110, there are first engagement portions 121 and 131 including Y direction locking surfaces 127 and 134 that are perpendicular to the Y direction and that face to the +Y direction, and second engagement portions 141 and 135 including Y direction subject locking surfaces 147 and 138 that are perpendicular to the Y direction and that face to the −Y direction. Further, as the engagement portions of the cover opposite plates 115 and 155 of the second cover component 150, there are first engagement portions 161 and 171 including Y direction subject locking surfaces 167 and 174 that are perpendicular to the Y direction and that face to the −Y direction, and second engagement portions 181 and 175 including Y direction locking surfaces 187 and 178 that are perpendicular to the Y direction and that face to the +Y direction.

In the first engagement portions 121, 131, 161, and 171 of the first cover component 110 and the second cover component 150, the first engagement portions (A) 121 and 161 are used for regulating or controlling the relative movement between the first cover component 110 and the second cover component 150 in the Z direction, but the first engagement portions (B) 131 and 171 are not used for regulating or controlling the relative movement. Further, even in the second engagement portions 141, 135, 181, and 175 of the first cover component 110 and the second cover component 150, the second engagement portions (A) 141 and 181 are used for regulating or controlling the relative movement between the first cover component 110 and the second cover component 150 in the Z direction, but the second engagement portions (B) 135 and 175 are not used for regulating or controlling the relative movement.

The first engagement portion (A) 121 of the first cover component 110 and the first engagement portion (A) 161 of the second cover component 150 are both formed between the negative electrode terminal segmenting holes 103a and 103b and the first segmenting holes 104a and 104b of the corresponding cover components 110 and 150. And both engagement portions 121 and 161 are engaged with each other. Further, the first engagement portion (B) 131 of the first cover component 110 and the first engagement portion (B) 171 of the second cover component 150 are both formed between the positive electrode terminal segmenting holes 102a and 102b and the second side plates 112 and 152 on the −X side of the corresponding cover components 110 and 150. And both engagement portions 131 and 171 are engaged with each other.

The second engagement portion (A) 141 of the first cover component 110 and the second engagement portion (A) 181 of the second cover component 150 are both formed between the first segmenting holes 104a and 104b and the positive electrode terminal segmenting holes 102a and 102b of the corresponding cover components 110 and 150. And both engagement portions 141 and 181 are engaged with each other. Further, the second engagement portion (B) 135 of the first cover component 110 and the second engagement portion (B) 175 of the second cover component 150 are all formed between the second side plates 112 and 152 on the +X side and the negative electrode terminal segmenting holes 103a and 103b of the corresponding cover components 110 and 150. And both engagement portions 135 and 175 are engaged with each other.

The first engagement portion (B) 131 of the first cover component 110 includes a tongue piece portion 133 that protrudes toward the −Z side (i.e., toward the second cover component 150) and a groove 132 that is concave toward the −Y side from the surface of the cover opposite plate 115 on the +Y side (i.e., from the cover opposite surface). The surface of the tongue piece portion 133 on the +Y side and the bottom surface of the groove 132 are perpendicular to the Y direction, face the +Y direction, and are parallel with each other. And these surfaces form the Y direction locking surface 134.

The first engagement portion (B) 171 of the second cover component includes a tongue piece portion 173 that protrudes toward the +Z side (i.e., toward the first cover component 110) and a groove 172 that is concave toward the +Y side from the surface of the cover opposite plate 155 on the −Y side (i.e., from the inner surface of the cover opposite plate 155). The surface of the tongue piece portion 173 on the −Y side and the bottom surface of the groove 172 are perpendicular to the Y direction, face the −Y direction, and are parallel with each other. And these surfaces form the Y direction subject locking surface 174, which is contacted with the Y direction locking surface 134 of the first engagement portion (B) 131 of the first cover component.

As for the groove 132 of the first engagement portion (B) 131 of the first cover component 110, the width thereof in the X direction is slightly wider than the width of the tongue piece portion 173 in the X direction. Therefore, the tongue piece portion 173 of the first engagement portion (B) 171 of the second cover component 150 is able to be inserted to the groove. Further, as for the groove 172 of the first engagement portion (B) 171 of the second cover component 150, the width thereof in the X direction is slightly wider than the width of the tongue piece portion 133 in the X direction. Therefore, the tongue piece portion 133 of the first engagement portion (B) 131 of the first cover component 110 is able to be inserted to the groove. In the embodiment, the groove 132 and the groove 172 have the same width and the same depth. In the embodiment, the tongue piece portion 133 and the tongue piece portion 173 have the same width in the X direction and the same thickness in the Y direction.

As for the respective tongue piece portions 133 and 173, in the pair of side surfaces facing each other in the X direction, the surface of the +X direction forms an X direction locking surface, and the surface of the −X direction forms an X direction subject locking surface. Further, as for the respective grooves 132 and 172, in the pair of groove side surfaces facing each other in the X direction, the surface of the +X direction forms an X direction locking surface, and the surface of the −X direction forms an X direction subject locking surface.

The X direction locking surfaces of the respective tongue piece portions 133 and 173 come into contact with the X direction subject locking surfaces of the corresponding grooves 172 and 132 when the respective tongue piece portions 133 and 173 enter the corresponding grooves 172 and 132. Further, the X direction subject locking surfaces of the respective tongue piece portions 133 and 173 come into contact with the X direction locking surfaces of the corresponding grooves 172 and 132 when the respective tongue piece portions 133 and 173 enter the corresponding grooves 172 and 132.

The second engagement portion (B) 135 of the first cover component 110 includes a tongue piece portion 137 that protrudes toward the −Z side (i.e., toward the second cover component 150) and a groove 136 that is concave from the inner surface of the cover opposite plate 115 toward the +Y side. The surface of the tongue piece portion 137 on the −Y side and the bottom surface of the groove 136 are perpendicular to the Y direction, face the −Y direction, and are parallel with each other. And these surfaces form the Y direction subject locking surface 138. That is, the second engagement portion (B) 135 of the first cover component 110 is point-symmetrical to the first engagement portion (B) 171 of the second cover component 150, and these are the same shape and the same size each other although one of them is arranged to the opposite direction against the other.

The second engagement portion (B) 175 of the second cover component 150 includes a tongue piece portion 177 that protrudes toward the +Z side (i.e., toward the first cover component 110) and a groove 176 that is concave from the cover opposite surface of the cover opposite plate 155 toward the −Y side. The surface of the tongue piece portion 177 on the +Y side and the bottom surface of the groove 176 are parallel with each other, are all perpendicular to the Y direction, and face the +Y direction. Then, these surfaces form the Y direction locking surface 178 coming into contact with the Y direction subject locking surface 138 of the second engagement portion (B) 135 of the first cover component 110. That is, the second engagement portion (B) 175 of the second cover component 150 is point-symmetrical to the first engagement portion (B) 131 of the first cover component 110, and these are the same shape and the same size each other although one of them is arranged to the opposite direction against the other.

The first engagement portion (A) 121 of the first cover component 110 includes a pair of Z direction regulation portions 123 that includes a claw 124 protruding in the X direction and a groove 122 that is concave from the cover opposite surface toward the −Y side. The surface of the Z direction regulation portion 123 on the +Y side and the bottom surface of the groove 122 are parallel with each other, are all perpendicular to the Y direction, and face the +Y direction. Then, these surfaces form the Y direction locking surface 127.

In the pair of Z direction regulation portions 123, one Z direction regulation portion 123 includes the claw 124 that protrudes in the +X direction and an elastic support portion 125 (refer to FIG. 4) that supports the claw 124. Therefore, the position of the claw 124 is able to change in the X direction. Further, the other Z direction regulation portion 123 includes the claw 124 that protrudes in the −X direction and an elastic support portion 125 that supports the claw 124. Therefore, the position of the claw 124 is able to change in the X direction. Each elastic support portion 125 extends in the −Z direction from the edge of the groove 122 of the first engagement portion (A) 121 on the +Z side, and the claw 124 is provided at the tip thereof.

The first engagement portion (A) 161 of the second cover component 150 includes a tongue piece portion 163 that protrudes toward the first cover component 110 and a groove 162 that is concave from the inner surface of the cover opposite plate 155 toward the +Y side. The surface of the tongue piece portion 163 on the −Y side and the bottom surface of the groove 162 are perpendicular to the Y direction, face the −Y direction, and are parallel with each other. And these surfaces form the Y direction subject locking surface 167 that comes into contact with the Y direction locking surface 127 of the first engagement portion (A) 121 of the first cover component 110.

The groove 162 of the first engagement portion (A) 161 is provided with a pair of groove side surfaces "a" that face each other in the X direction and a groove side surface "b" that connects the edges of the pair of groove side surfaces "a" on the −Z side.

Each of the pair of groove side surfaces "a" is provided with a protrusion 164 that protrudes from one groove side surface "a" toward the other groove side surface "a". In the groove side surfaces "a", the −Z-side portion in relation to the protrusion 164 forms a Z direction regulation concave portion 168 which is relatively concave in the X direction from the top point of the protrusion 164 and to which the claw 124 of the first engagement portion (A) 121 of the first cover component 110 is inserted.

The distance between the protrusion 164 of the first engagement portion (A) 161 of the second cover component 150 and the groove side surface "b" of the first engagement portion (A) 161 on the −Z side (i.e., the length of the Z direction regulation concave portion 168 in the Z direction) is much longer than the Z-direction width of the claw 124 entering the concave portion 168. For this reason, when the claws 124 enter the Z direction regulation concave portions 168 and 148, the movement thereof in the Z direction is regulated by the protrusion 164, but is movable in the Z direction by the difference between the width of the claw 124 in the Z direction and the length of the Z direction regulation concave portion 168 in the Z direction.

The second engagement portion (A) 181 of the second cover component 150 is point-symmetrical to the first engagement portion (A) 121 of the first cover component 110. And these are the same shape and the same size as each other although one of them is arranged to the opposite direction against the other. That is, the second engagement portion (A) 181 of the second cover component 150 includes a claw 184 that protrudes in the X direction and that is caught on a protrusion 144 described later, a pair of Z direction regulation portions 183 that includes an elastic support portion 185 supporting the claw, and a groove 182 that is concave from the cover opposite surface toward the −Y side. Furthermore, the surface of the Z direction regulation portion 183 on the +Y side and the bottom surface of the groove 182 are parallel with each other, are both perpendicular to the Y direction, and both face the +Y direction. Then, these surfaces form the Y direction locking surface 187.

The second engagement portion (A) 141 of the first cover component 110 is point-symmetrical to the first engagement portion (A) 161 of the second cover component 150. And these are the same shape as each other although one of them is arranged to the opposite direction against the other. That is, the second engagement portion (A) 141 of the first cover component 110 includes a tongue piece portion 143 that protrudes toward the second cover component 150 and a groove 142 that is concave from the inner surface of the cover opposite plate 115 toward the +Y side. The surface of the tongue piece portion 143 on the −Y side and the bottom surface of the groove 142 are perpendicular to the Y direction, face the −Y direction, and are parallel with each other. And these surfaces form the Y direction subject locking surface 147 coming into contact with the Y direction locking surface 187 of the second engagement portion (A) 181 of the second cover component 150.

Further, in the groove 142 of the second engagement portion (A) 141, the pair of groove side surfaces facing each other in the X direction is provided with a protrusion 144 that protrudes from one groove side surface toward the other groove side surface for hitching the claw 184. In the groove side surfaces, the +Z-side portion in relation to the protrusion 144 forms the Z direction regulation concave portion 148 to which the claw 184 of the second engagement portion (A) 181 of the second cover component 150 is inserted.

The first side plate 111 of the first cover component 110 and the first side plate 151 of the second cover component 150 are respectively provided with protruding bar materials 117 and 157 that protrude toward the other first side plate. The respective protruding bar materials 117 and 157 are provided at the center position of the first side plates 111 and 151 in the X direction and at the center position of the first side plates 111 and 151 in the Y direction. A gap is present between each of the +Y-side surfaces of the protruding bar materials 117 and 157 and each of the inner surfaces of the cover opposite plates 115 and 155 of the corresponding cover component. This is because the opening area of the first gas passage hole 104, formed in the first segmenting holes 104a and 104b, needs to be ensured, although the first segmenting holes 104a and 104b are present on the +Y side of the protruding bar materials 117 and 157 when the first cover component 110 and the second cover component 150 engage with each other to form the lead insulating cover 100.

The lengths of the protruding bar materials 117 and 157 in the Z direction are equal to those of the second side plates 112 and 152 of the corresponding cover components 110 and 150 in the Z direction. For this reason, a –Z-side end surface 112a of the second side plate 112 of the first cover component 110 abuts on a +Z-side end surface 152a of the second side plate 152 of the second cover component 150, and a –Z-side end surface 117a of the protruding bar material 117 of the first cover component 110 comes into contact with a +Z-side end surface 157a of the protruding bar material 157 of the second cover component 150.

However, the first cover component 110 and the second cover component 150 described above are the same shape and the same size as each other. This may be understood from, for example, FIG. 4, where when the first cover component 110 is rotated by 180° within the paper surface, the first cover component 110 completely overlaps the second cover component 150. Accordingly, although it is repetitively described, the first engagement portion (A) 121 of the first cover component 110 and the second engagement portion (A) 181 of the second cover component 150 have the same shape and the same size in the components. Hereinafter, in the same manner, the first engagement portion (B) 131 of the first cover component 110 and the second engagement portion (B) 175 of the second cover component 150 are the same as each other, the second engagement portion (A) 141 of the first cover component 110 and the first engagement portion (A) 161 of the second cover component 150 are the same as each other, and the second engagement portion (B) 135 of the first cover component 110 and the first engagement portion (B) 171 of the second cover component 150 are the same as each other.

Next, a procedure of manufacturing the battery will be described.

First, the respective electrode plates 10 and 20 are formed by attaching an active material or the like to a rectangular core such as an aluminum foil or a copper foil. Next, the negative electrode plate body 21 is covered by the separator 30. Then, the electrode stacked body 40 is formed by alternately stacking the plurality of positive electrode plates 10 and the plurality of negative electrode plates 20 respectively covered by the separators 30, and covers the electrode stacked body 40 by an insulating sheet 49 (FIG. 3).

However, at this time, the tabs 14 and 24 of the electrode stacked body 40 are not covered by the insulating sheet 49.

Next, as shown in FIG. 3, one ends of the leads 50 and 55 are respectively welded to the positive electrode tab 14 and the negative electrode tab 24 of the electrode stacked body 40. Subsequently, the leads 50 and 55 are bent using a jig. Then, the other ends of the leads 50 and 55 are respectively connected to the lead connection portions 70b and 75b of the terminals 70 and 75 fixed to the cover 65 of the battery case 60 through, for example, the screw 57 or the like.

After the terminals 70 and 75 fixed to the cover 65 of the battery case 60 are connected to the electrode stacked body 40 through the leads 50 and 55, the leads 50 and 55 are covered by the lead insulating cover 100. The timing at which the leads 50 and 55 are covered by the lead insulating cover 100 is set until the electrode stacked body 40 is inserted into the battery case body 61 (the leads 50 and 55 are exposed from the battery case body 61) after connecting the terminals 70 and 75 fixed to the cover 65 of the battery case 60 to the electrode stacked body 40 through the leads 50 and 55 as shown in FIG. 1.

At the time of covering the leads 50 and 55 by the lead insulating cover 100, the cover opposite plates 115 and 155 of the first cover component 110 and the second cover component 150 of the lead insulating cover 100 are made to face the +Y side, the positive electrode terminal segmenting holes 102a and 102b of the cover components 110 and 150 are made to face the lead connection portions 70b and 75b of the positive electrode terminal 70. And the negative electrode terminal segmenting holes 103a and 103b of the cover components 110 and 150 are made to face the lead connection portions 70b and 75b of the negative electrode terminal 75. In other words, the first engagement portion (B) 131 of the first cover component 110 and the first engagement portion (B) 171 of the second cover component 150 are made to face each other with the terminals 70 and 75 interposed therebetween, the second engagement portion (A) 141 of the first cover component 110 and the second engagement portion (A) 181 of the second cover component 150 are made to face each other, the first engagement portion (A) 121 of the first cover component 110 and the first engagement portion (A) 161 of the second cover component 150 are made to face each other, and the second engagement portion (B) 135 of the first cover component 110 and the second engagement portion (B) 175 of the second cover component 150 are made to face each other.

Next, the gap between the cover components 110 and 150 is narrowed. In the meantime, as shown in FIGS. 1 and 4 to 7, the tongue piece portion 173 of the first engagement portion (B) 171 of the second cover component 150 enters the groove 132 of the first engagement portion (B) 131 of the first cover component 110. And the tongue piece portion 133 of the first engagement portion (B) 131 of the first cover component 110 enters the groove 172 of the first engagement portion (B) 171 of the second cover component 150. That is, the first engagement portion (B) 131 of the first cover component 110 and the first engagement portion (B) 171 of the second cover component 150 engage with each other.

As a result, the Y direction locking surface 134 facing the +Y side of the first engagement portion (B) 131 of the first cover component 110 comes into contact with the Y direction subject locking surface 174 facing the –Y side of the first engagement portion (B) 171 of the second cover component 150 (particularly, refer to FIG. 5).

Furthermore, the X direction locking surface of the first engagement portion (B) 131 of the first cover component 110 comes into contact with the X direction subject locking surface of the first engagement portion (B) 171 of the second cover component 150. And the X direction subject locking surface of the first engagement portion (B) 131 of the first cover component 110 comes into contact with the X direction locking surface of the first engagement portion (B) 171 of the second cover component 150. That is, both side surfaces of the tongue piece portion 133 of the first engagement portion (B) 131 of the first cover component 110 come into contact with both groove side surfaces of the groove 172 of the first engagement portion (B) 171 of the second cover component 150. And both groove side surfaces of the groove 132 of the first engagement portion (B) 131 of the first cover component 110 come into contact with both side surfaces of the tongue piece portion 173 of the first engagement portion (B) 171 of the second cover component 150.

For this reason, when the first engagement portion (B) 131 of the first cover component 110 engages with the first engagement portion (B) 171 of the second cover component 150, the second cover component 150 is not movable in the (±) X direction relative to the first cover component 110. In this engagement, since the relative movement in the Y direction is regulated by the contact between the Y direction locking surface 134 facing the +Y side of the first engagement portion (B) 131 of the first cover component 110 and the Y direction subject locking surface 174 facing the −Y side of the first engagement portion (B) 171 of the second cover component 150, the second cover component 150 is not movable in the −Y direction relative to the first cover component 110, but is movable in the +Y direction relative thereto.

Further, at the time of narrowing the gap between the cover components 110 and 150, the tongue piece portion 177 of the second engagement portion (B) 175 of the second cover component 150 enters the groove 136 of the second engagement portion (B) 135 of the first cover component 110. And the tongue piece portion 137 of the second engagement portion (B) 135 of the first cover component 110 enters the groove 176 of the second engagement portion (B) 175 of the second cover component 150. That is, the second engagement portion (B) 135 of the first cover component 110 engages with the second engagement portion (B) 175 of the second cover component 150. As a result, the Y direction subject locking surface 138 facing the −Y side of the second engagement portion (B) 135 of the first cover component 110 comes into contact with the Y direction locking surface 178 facing the +Y side of the second engagement portion (B) 175 of the second cover component 150.

Furthermore, the X direction locking surface of the second engagement portion (B) 135 of the first cover component 110 comes into contact with the X direction subject locking surface of the second engagement portion (B) 175 of the second cover component 150. And the X direction subject locking surface of the second engagement portion (B) 135 of the first cover component 110 comes into contact with the X direction locking surface of the second engagement portion (B) 175 of the second cover component 150. That is, both side surfaces of the tongue piece portion 137 of the second engagement portion (B) 135 of the first cover component 110 came into contact with both groove side surfaces of the groove 176 of the second engagement portion (B) 175 of the second cover component 150. And both groove side surfaces of the groove 136 of the second engagement portion (B) 135 of the first cover component 110 come into contact with both side surfaces of the tongue piece portion 177 of the second engagement portion (B) 175 of the second cover component 150.

For this reason, when the second engagement portion (B) 135 of the first cover component 110 engages with the second engagement portion (B) 175 of the second cover component 150, the second cover component 150 is not movable relative to the first cover component 110 in the (±) X direction. In this engagement, since the relative movement in the Y direction is regulated by the contact between the Y direction subject locking surface 138 facing the −Y side of the second engagement portion (B) 135 of the first cover component 110 and the Y direction locking surface 178 facing the +Y side of the second engagement portion (B) 175 of the second cover component 150, the second cover component 150 is not movable relative to the first cover component 110 in the +Y direction, but is movable in the −Y direction.

However, as described above, the second cover component 150 is not movable relative to the first cover component 110 in the −Y direction due to the engagement between the first engagement portion (B) 131 of the first cover component 110 and the first engagement portion (B) 171 of the second cover component 150. And the second cover component 150 is not movable relative to the first cover component 110 in the +Y direction due to the engagement between the second engagement portion (B) 135 of the first cover component 110 and the second engagement portion (B) 175 of the second cover component 150. For this reason, the second cover component 150 is not movable relative to the first cover component 110 in the (±) X direction and the (±) Y direction due to the engagement between the first engagement portion (B) 131 of the first cover component 110 and the first engagement portion (B) 171 of the second cover component 150 and the engagement between the second engagement portion (B) 135 of the first cover component 110 and the second engagement portion (B) 175 of the second cover component 150.

Further, at the time of narrowing the gap between the cover components 110 and 150, the tongue piece portion 163 of the first engagement portion (A) 161 of the second cover component 150 enters the groove 122 of the first engagement portion (A) 121 of the first cover component 110. And the pair of Z direction regulation portions 123 of the first engagement portion (A) 121 of the first cover component 110 enters the groove 162 of the first engagement portion (A) 161 of the second cover component 150. When the Z direction regulation portion 123 enters the groove 162, the claw 124 protruding in the X direction of the Z direction regulation portion 123 comes into contact with the protrusion 164 protruding in the X direction of the groove side surface. If the Z direction regulation portion 123 will further enter the groove 162 even when the claw 124 comes into contact with the protrusion 164 of the groove side surface, the elastic support portion 125 supporting the claw 124 is elastically deformed in the X direction, and the position of the claw 124 in the X direction is displaced, so that the claw 124 passes over the protrusion 164 of the groove side surface and enters the Z direction regulation concave portion 168 of the groove 162. Accordingly, the first engagement portion (A) 121 of the first cover component 110 engages with the first engagement portion (A) 161 of the second cover component 150.

As a result, the Y direction locking surface 127 facing the +Y side of the first engagement portion (A) 121 of the first cover component 110 comes into contact with the Y direction subject locking surface 167 facing the −Y side of the first engagement portion (A) 161 of the second cover component 150 (particularly, refer to FIG. 6). Furthermore, the front end of each claw 124 of the first engagement portion (A) 121 of the first cover component 110 comes into contact with the bottom surface of the Z direction regulation concave portion 168, that is, the groove side surface of the groove 162 of the first engagement portion (A) 161 of the second cover component 150.

For this reason, when the first engagement portion (A) 121 of the first cover component 110 engages with the first engagement portion (A) 161 of the second cover component 150, the relative movement of the second cover component 150 relative to the first cover component 110 is regulated in the (±) X direction, and the second cover component 150 is not relatively movable in the −Y direction. Furthermore, since the claw 124 protruding in the X direction of the first engagement portion (A) 121 of the first cover component 110 enters the groove of the first engagement portion (A) 161 of the second cover component 150 and the Z direction regulation concave portion 168 concave in the X direction, the relative movement of the second cover component 150 relative to the first cover component 110 is regulated in the Z direction. However, the length of the Z direction regulation concave portion 168 in the Z direction is longer than the width of the claw 124 in the Z direction, and the claw 124 is relatively movable in the Z direction by the difference between the length of the Z direction regulation concave portion 168 in the Z direction and the width of the claw 124 in the Z direction. For this reason, the second cover component 150 is movable by the difference relative to the first cover component 110 in the Z direction.

Further, at the time of narrowing the gap between the cover components, the pair of Z direction regulation portions 183 of the second engagement portion (A) 181 of the second cover component 150 enters the groove 142 of the second engagement portion (A) 141 of the first cover component 110. And the tongue piece portion 143 of the second engagement portion (A) 141 of the first cover component 150 enters the groove 182 of the second engagement portion (A) 181 of the second cover component 150. Even in this case, in the same manner as described above, the claw 184 of the second engagement portion (A) 181 of the second cover component 150 enters the Z direction regulation concave portion 148 of the groove 142 of the second engagement portion (A) 141 of the first cover component 110. Accordingly, the second engagement portion (A) 141 of the first cover component 110 engages with the second engagement portion (A) 181 of the second cover component 150.

As a result, the Y direction subject locking surface 147 facing the −Y side of the second engagement portion (A) 141 of the first cover component 110 comes into contact with the Y direction locking surface 187 facing the +Y side of the second engagement portion (A) 181 of the second cover component 150. Furthermore, the front end of each claw 184 of the second engagement portion (A) 181 of the second cover component 150 comes into contact with the bottom surface of the Z direction regulation concave portion 148, that is, the groove side surface of the groove 142 of the second engagement portion (A) 141 of the first cover component 110.

For this reason, when the second engagement portion (A) 141 of the first cover component 110 engages with the second engagement portion (A) 181 of the second cover component 150, the relative movement of the second cover component 150 relative to the first cover component 110 is regulated in the (±) X direction, and the second cover component 150 is not movable in the +Y direction. Furthermore, since the claw 184 protruding in the X direction of the second engagement portion (A) 181 of the second cover component 150 enters the groove 142 of the second engagement portion (A) 141 of the first cover component 110 and the Z direction regulation concave portion 148 concave in the X direction, the relative movement of the second cover component 150 relative to the first cover component 110 is regulated in the Z direction. However, even in this case, the second cover component 150 is movable relative to the first cover component 110 in the Z direction by the difference between the length of the Z direction regulation concave portion 148 in the Z direction and the width of the claw 184 in the Z direction.

Furthermore, as described above, the second cover component 150 is not movable relative to the first cover component 110 in the −Y direction due to the engagement between the first engagement portion (A) 121 of the first cover component 110 and the first engagement portion (A) 161 of the second cover component 150. And the second cover component 150 is not movable relative to the first cover component 110 in the +Y direction due to the engagement between the second engagement portion (A) 141 of the first cover component 110 and the second engagement portion (A) 181 of the second cover component 150. For this reason, the second cover component 150 is not movable relative to the first cover component 110 in the (±) Y direction due to the engagement between the first engagement portion (A) 121 of the first cover component 110 and the first engagement portion (A) 161 of the second cover component 150 and the engagement between the second engagement portion (A) 141 of the first cover component 110 and the second engagement portion (A) 181 of the second cover component 150.

However, at the time of narrowing the gap between the cover components in the Z direction, the −Z-side end surface 112a of the second side surface 112 of the first cover component 110 bumps into the +Z-side end surface 152a of the second side surface 152 of the second cover component 150, and the +Z-side end surface 157a of the protruding bar material 157 of the second cover component 150 bumps into the −Z-side end surface 117a of the protruding bar material 117 of the first cover component 110, and the gap between the cover components 110 and 150 may not be narrowed any more. That is, the second cover component 150 is not movable in the +Z direction relative to the first cover component 110 since the end surfaces thereof bump into each other.

Figure 8:
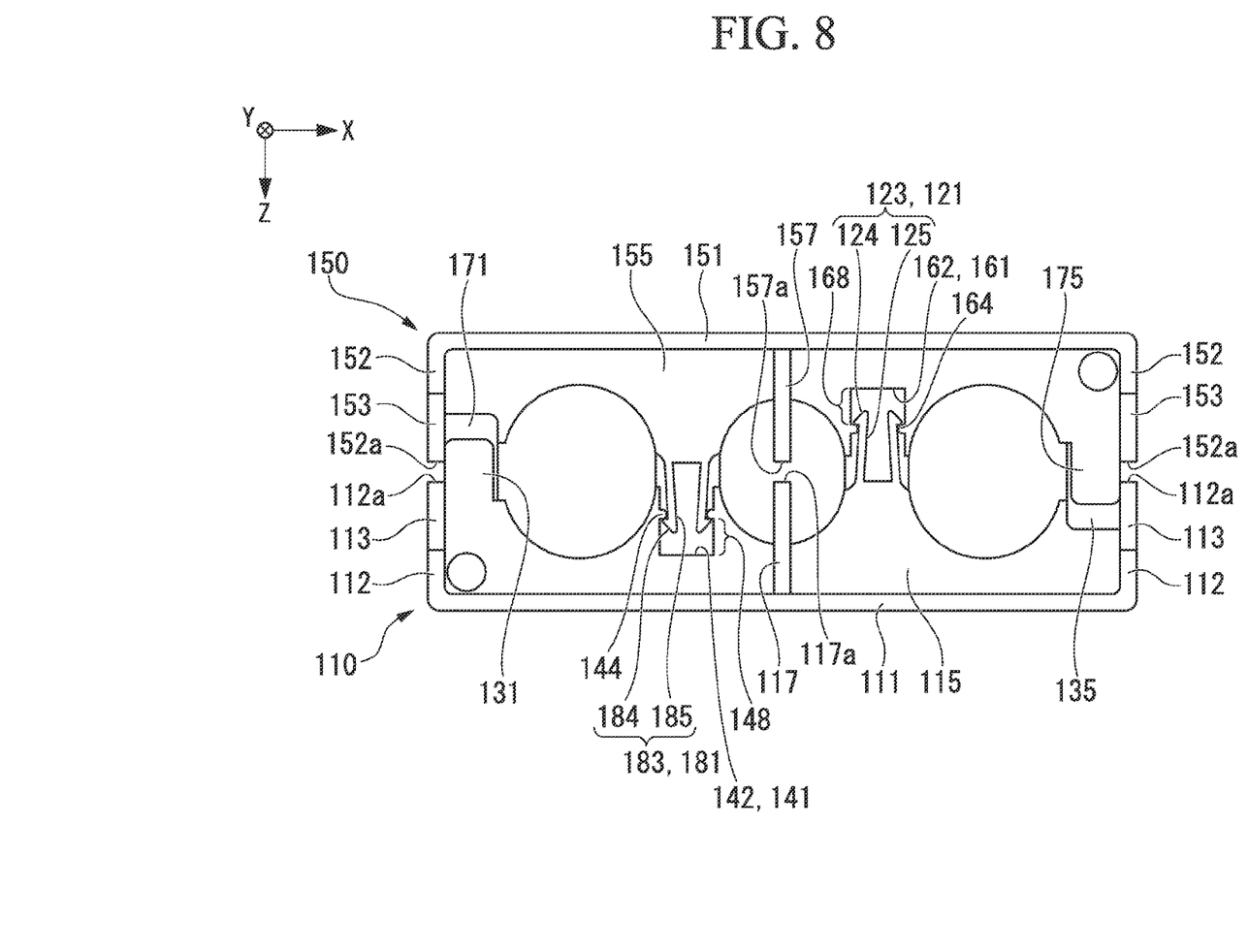
FIG. 8 is a (first) rear view illustrating the lead insulating cover when the components engage with each other in the embodiment according to the invention.

When the second cover component 150 moves in the +Z direction relative to the first cover component 110, first, the claw 124 of the first engagement portion (A) 121 of the first cover component 110 enters the Z direction regulation concave portion 168 of the first engagement portion (A) 161 of the second cover component 150, and at the same time, the claw 184 of the second engagement portion (A) 181 of the second cover component 150 enters the Z direction regulation concave portion 148 of the second engagement portion (A) 141 of the first cover component 110. Then, the end surfaces bump into each other. For this reason, in the state where the corresponding claws 124 and 184 respectively enter the Z direction regulation concave portions 168 and 148, that is, the first cover component 110 engages with the second cover component 150, the second cover component 150 is movable in the Z direction relative to the first cover component 110 from the relative position of the component 150 in the Z direction immediately after the corresponding claws 124 and 184 respectively enter the Z direction regulation concave portions 168 and 148 as shown in FIG. 8 to the relative position of the component 150 where the end surfaces bump into each other as shown in FIG. 9.

In this manner, when the first cover component 110 engages with the second cover component 150, the second cover component 150 is not movable relative to the first cover component 110 in the X direction and the Y direction, and the range of the relative movement in the Z direction is restricted.

When the first cover component 110 engages with the second cover component 150, so that the components 110 and 150 form the lead insulating cover 100, the leads 50 and 55 are accommodated inside the lead insulating cover 100. Specifically, the leads 50 and 55 in the (±) X direction are blocked by the pair of second side plates 112 and 152 of the lead insulating cover 100, the leads in the +Y direction are blocked by the cover opposite plates 115 and 155 of the lead insulating cover 100, and the leads in the (±) Z direction are blocked by the first side plates 111 and 151 of the lead insulating cover 100.

Next, the electrode stacked body 40, the leads 50 and 55 connected to the electrode stacked body 40, and the lead insulating cover 100 covering the leads 50 and 55 are completely inserted into the battery case body 61, and the opening of the case body 61 is blocked by the cover 65. At this time, it is desirable that the lead insulating cover 100 be inserted into the battery case body 61 after the gap between the first side plate 111 of the first cover component 110 and the first side plate 151 of the second cover component 150 of the lead insulating cover 100 is narrowed in the Z direction within the relative movable range in the Z direction. Then, the edge of the cover 65 is welded to the edge of the battery case body 61.

Next, an electrolyte is injected into the battery case 60 from the injection hole 66 of the cover 65. The electrolyte flows from the injection hole 66 of the cover 65 into the battery case 60 through the electrolyte passage holes 116 and 156 of the lead insulating cover 100. When a predetermined amount of electrolyte is injected into the battery case 60, the injection hole 66 of the cover 65 is sealed.

In the battery, the insulation between the leads 50 and 55 and the pair of first side plates 63 of the battery case 60 is ensured at the pair of first side plates 111 and 151 of the lead insulating cover 100. And the insulation between the leads 50 and 55 and the pair of second side plates 64 of the battery case 60 is ensured at the second side plates 112 and 152 of the lead insulating cover 100. Further, the insulation between the leads 50 and 55 and the cover 65 of the battery case 60 is ensured at the cover opposite plates 115 and 155 of the lead insulating cover 100.

As described above, in the embodiment, the lead insulating cover 100 includes two components 110 and 150 cooperatively forming the lead accommodating space 101, when two components 110 and 150 engage with each other even after connecting the electrode terminals 70 and 75 to the tabs 14 and 24 extending from the electrode stacked body 40 through the leads 50 and 55, the leads 50 and 55 are accommodated inside the space 101, and the insulating property between the leads 50 and 55 and the battery case 60 may be ensured. Accordingly, it is possible to avoid time-consuming work in which the lead is connected to the external connection terminal while the lead is inserted into the lead extracting hole of the insulating member ensuring the insulating property between the lead and the battery case as in the related art. Furthermore, it is possible to avoid work in which the electrode stacked body and the cover of the battery case are connected to each other through the lead and the state of the insulating member hanging on the lead is handled. Accordingly, the burden associated with battery manufacturing work may be reduced.

Furthermore, in the embodiment, since the gap between the first side plate 111 of the first cover component 110 and the first side plate 151 of the second cover component 150 of the lead insulating cover 100 in the Z direction may be changed within a predetermined range. Thus, it is possible to handle a change in specification such as a change in number of the electrode plates of the electrode stacked body 40 or a change in thickness of the electrode plate.

Further, in the embodiment, the lead insulating cover 100 is formed by two components 110 and 150, but since the two components 110 and 150 are the same piece as each other, manufacturing costs of the lead insulating cover 100 may be suppressed.

Figure 10:
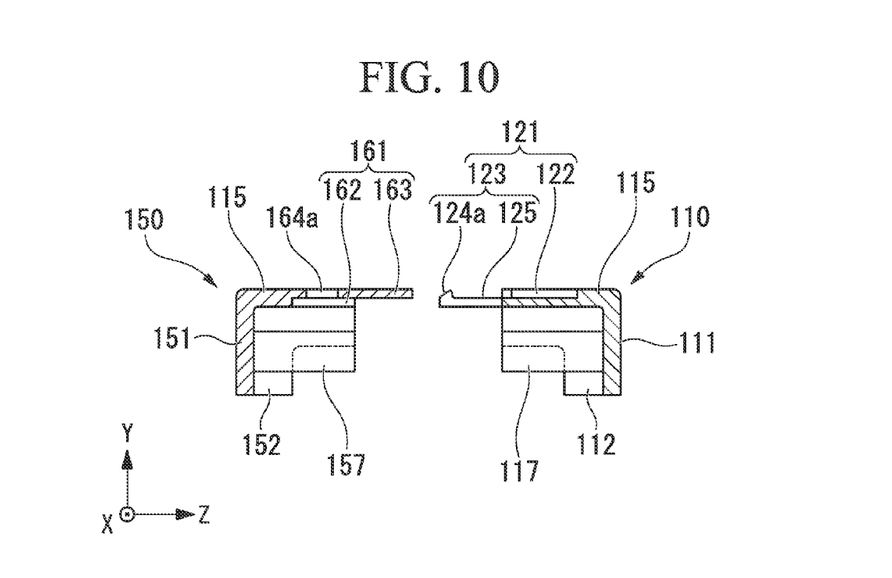
FIG. 10 is a cross-sectional view illustrating a lead insulating cover of a first modified example of the embodiment according to the invention.

Furthermore, in the embodiment, the claws 124 and 184 protruding in the X direction and the Z direction regulation concave portions 168 and 148 concave in the X direction are provided in order to regulate the relative movement of the second cover component 150 relative to the first cover component 110 in the Z direction. However, the protruding directions of the claws 124 and 184 and the concave directions of the concave portions 168 and 148 may not be the X direction if the directions are different from the Z direction. For example, as shown in FIG. 10, the claw 124a may protrude in the Y direction, and the Z direction regulation concave portion 164a may be concave in the Y direction.

Figure 11:
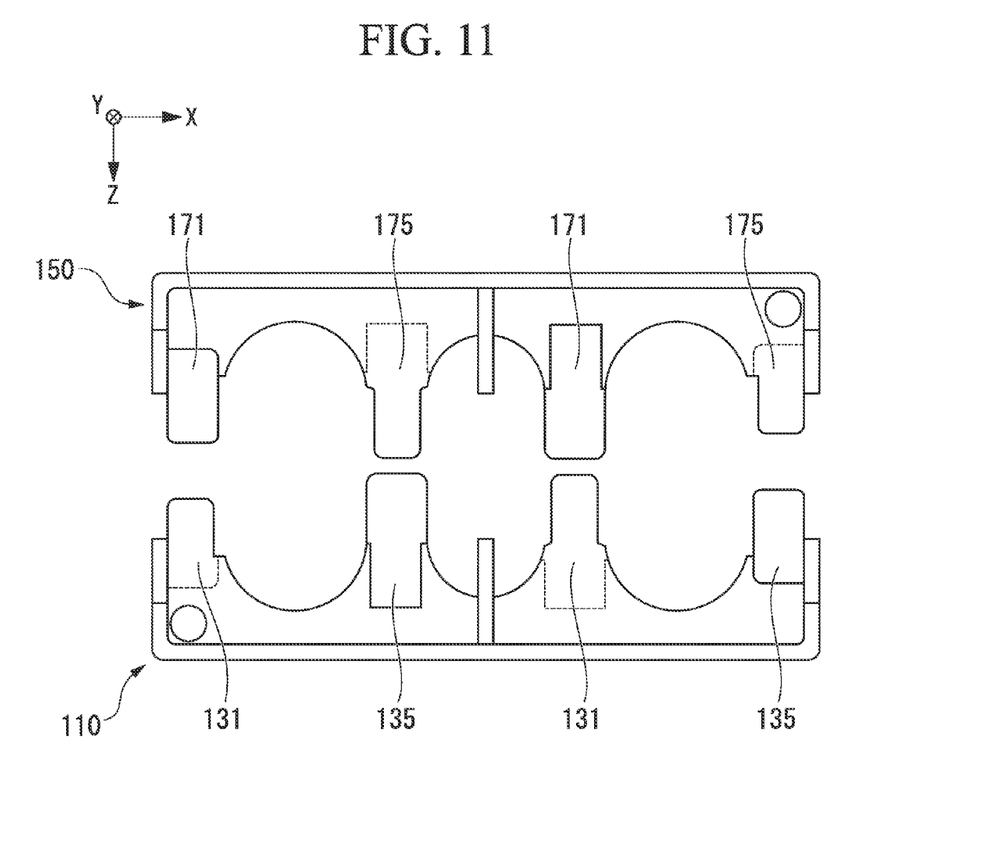
FIG. 11 is a rear view illustrating a lead insulating cover of a second modified example of the embodiment according to the invention.

Further, in the embodiment, as shown in FIG. 7, the first cover component 110 and the second cover component 150 are provided with the first engagement portions (B) 131 and 171, the second engagement portions (A) 141 and 181, the first engagement portions (A) 121 and 161, and the second engagement portions (B) 135 and 175 which are sequentially provided from the −X side. However, as shown in FIG. 11, the first cover component 110 and the second cover component 150 may be provided with the first engagement portions (B) 131 and 171, the second engagement portions (B) 135 and 175, the first engagement portions (B) 131 and 171, and the second engagement portions (B) 135 and 175 which are sequentially provided from the −X side. In this case, since the engagement portions (A) 141 and 181 regulating the relative movement in the Z direction between the components 110 and 150 are not provided, the second cover component 150 may be movable relative to the first cover component 110 in the Z direction. That is, in the invention, a configuration may be adopted in which the first cover component 110 engages with the second cover component 150 and the lead insulating cover 100 is formed in this engagement state. Then, the second cover component 150 may not be essentially movable relative to the first cover component 110 in the specific direction. Further, the first cover component 110 and the second cover component 150 may be provided with the first engagement portions (A) 121 and 161, the second engagement portions (A) 141 and 181, the first engagement portions (A) 121 and 161, and the second engagement portions (A) 141 and 181 which are sequentially provided from the −X side.

Further, in the embodiment, the first cover component 110 and the second cover component 150 are respectively provided with the first engagement portions (B) 131 and 171, the second engagement portions (A) 141 and 181, the first engagement portions (A) 121 and 161, and the second engagement portions (B) 135 and 175. However, only the second engagement portions (A) 141 and 181 and the first engagement portions (A) 121 and 161 may be provided, and only the first engagement portions (B) 131 and 171 and the second engagement portions (B) 135 and 175 may be provided.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A battery comprising:
an electrode stacked body in which positive and negative electrode plates are alternately stacked with separators;
a battery case including a case body formed with a concave for storing the electrode stacked body and a cover for covering an opening of the case body;
positive and negative electrode terminals that are provided to the cover so as to link the inside and the outside of the battery case;
a lead that electrically connects tabs extending from the electrode plates of the electrode stacked body to the electrode terminals; and
a lead insulating cover made of an insulating material and including a side plate and a terminal through-hole,
wherein the side plate faces an inner peripheral surface of the case body in the battery case and a space for storing the lead is formed by the side plate,
wherein one end of the electrode terminal enters the space,
wherein the lead insulating cover includes a first cover component and a second cover component that cooperatively form the space and the terminal through-hole, and
wherein the first cover component and the second cover component respectively include engagement portions joining each other detachably;
wherein the first cover component forms one component in a first direction in which the plurality of electrode plates is stacked in the portion of the lead insulating cover, and the second cover component forms the other component in the first direction in the portion of the lead insulating cover, and
wherein when the engagement portion of the first cover component and the engagement portion of the second cover component engage with each other, the first cover component is restrained so as not to move relative to the second cover component in a direction perpendicular to the first direction, that is, a second direction in which the electrode terminal is close to or away from the electrode stacked body and a third direction which is perpendicular to the first direction and to the second direction;
wherein the first cover component includes a first engagement portion and a second engagement portion as the engagement portion,
wherein the second cover component includes a first engagement portion engaging with the first engagement portion of the first cover component, and a second engagement portion engaging with the second engagement portion of the first cover component as the engagement portion,
wherein a locking surface facing one direction of the second direction is formed in the first engagement portion of the first cover component, and a subject locking surface contacting with the locking surface is formed in the first engagement portion of the second cover component, and
wherein a locking surface facing one direction of the second direction is formed in the second engagement portion of the second cover component, and a subject locking surface coming into contact with the locking surface is formed in the second engagement portion of the first cover component.

2. The battery according to claim 1,
wherein a locking surface facing one direction of the third direction and a subject locking surface facing the other direction of the third direction are formed in the engagement portion of the first cover component, and
wherein a subject locking surface coming into contact with the locking surface of the first cover component, and a locking surface coming into contact with the subject locking surface of the first cover component are formed in the engagement portion of the second cover component.

3. The battery according to claim 2,
wherein in the engagement portion of the first cover component and the engagement portion of the second cover component, one engagement portion includes a claw that protrudes in a direction different from the first direction and an elastic support portion that supports the claw so that the position of the claw is able to change in the protruding direction of the claw, and
wherein in the engagement portion of the first cover component and the engagement portion of the second cover component, the other engagement portion includes a concave portion which the claw enters into.

4. The battery according to claim 3,
wherein the battery case includes a rupturable vent that is operated when inside of the battery case becomes a predetermined pressure or more due to a gas generated inside the battery case,
wherein the lead insulating cover includes a first gas passage hole that penetrates from the space toward the rupturable vent and a pair of side plates that serves as the side plates facing each other in the third direction as a direction perpendicular to the first direction as the stacked direction of the plurality of electrode plates stacked and perpendicular to the second direction as the direction in which the electrode terminal is close to or away from the electrode stacked body, and
wherein the pair of side plates of the lead insulating cover includes a second gas passage hole that introduces the gas, accumulated between the inner surface of the battery case and the outer peripheral edge adjacent to the outer peripheral edge where the tab extends and corresponds to the outer peripheral edges of the plurality of electrode plates, into the space.

5. The battery according to claim 4,
wherein the first cover component and the second cover component have a same shape and a same dimensions.

* * * * *